United States Patent [19]

Bhattacharyya et al.

[11] 4,420,586
[45] Dec. 13, 1983

[54] NON-AQUEOUS DISPERSION POLYMERIZATION OF VINYL MONOMERS

[75] Inventors: Bhupati R. Bhattacharyya, Downers Grove; Edward G. Ballweber, Glenwood, both of Ill.

[73] Assignee: Nalco Chemical Company, Oak Brook, Ill.

[21] Appl. No.: 445,326

[22] Filed: Nov. 29, 1982

[51] Int. Cl.³ .............................................. L08F 2/14
[52] U.S. Cl. ............................... 524/769; 526/303.1; 526/317; 526/212; 524/555; 524/556
[58] Field of Search ................... 526/212, 303.1, 317; 524/555, 556, 769

[56] References Cited

U.S. PATENT DOCUMENTS 2,560,680  7/1951  Allewelt .............................. 526/212
4,267,103  5/1981  Cohen ................................. 526/212

FOREIGN PATENT DOCUMENTS 56-000813  7/1981  Japan ................................. 524/769

Primary Examiner—Joseph L. Schofer
Assistant Examiner—Peter F. Kulkosky
Attorney, Agent, or Firm—John G. Premo; Robert A. Miller

[57] ABSTRACT

Non-aqueous dispersion polymers are formed using certain polymer oil-soluble oxygen containing solvents having at least two labile hydrogen atoms and at least one tertiary carbon atom. Non-aqueous dispersion polymers prepared in this manner do not require the use of block or graft copolymer stabilizers.

13 Claims, No Drawings

NON-AQUEOUS DISPERSION POLYMERIZATION OF VINYL MONOMERS

INTRODUCTION

This invention relates to the production of unique non-aqueous dispersion polymers. Non-aqueous dispersion polymerization may be defined broadly as a heterogeneous polymerization process in which vinyl addition monomers are polymerized in an organic solvent in which they are originally soluble, but in which the resultant polymer is not soluble. Non-aqueous dispersion polymerization is discussed in detail in the book *Dispersion Polymerization in Organic Media*, edited by K. E. G. Barrett and published by John Wiley & Sons, New York, 1975. Most non-aqueous dispersion polymerizations are conducted using as the reaction media an organic liquid and a stabilizer, typically a block or graft copolymer to prevent settling of the solid polymer during the reaction. By conducting the polymerization in a non-aqueous media, materials which are especially useful in the paint, coatings, and other industries can be prepared since no water, which oftentimes interferes with the setting and film forming of paints and coatings, is present. When a stabilizer is selected for use in a non-aqueous dispersion polymerization process, care must be undertaken to insure that it is compatible with the use to which the resultant polymer product is employed, and further, care must be taken to use the proper amount of stabilizer so as to obtain a polymer having a particle size small enough to remain in "suspension." It would be an advance to the art if a system could be discovered for non-aqueous dispersion polymerization systems which did not require such a stabilizer.

Accordingly, this invention is directed to a unique non-aqueous dispersion polymerization process in which the reaction media, the organic liquid, acts as a stabilizer for the resultant polymer.

THE INVENTION

This invention is accordingly directed to the preparation of non-aqueous dispersion polymers in certain unique branching organic liquids. The dispersion polymers which while being detailed later in the specification, include polymers of typical vinyl addition monomers which are polymerized in an oxygen-containing solvent capable of branching with the polymer and which additionally contains tertiary carbon atoms and labile hydrogen atoms. We have found surprisingly that the resultant polymer reacts with the solvent used so as to provide a stable non-aqueous dispersion polymer without the need for additional stabilizer. A particularly useful solvent is Texanol, a 2,2-dimethyl-3-hydroxy-4-methylamyl isobutarate, available from Eastman Chemical Products, Inc.

The Vinyl Monomers

Vinyl monomers which may be polymerized by the non-aqueous dispersion technique of this invention include those which while being initially soluble in the reaction media produce when polymerized under free radical forming conditions a polymer which is insoluble in the reaction media. Vinyl monomers which are useful in the instant invention include: acrylamide, methacrylamide, acrylic acid, methacrylic acid, methylacrylate, ethylacrylate, alkyl acrylates, $C_1$-$C_{18}$ methacrylates, $C_1$-$C_{18}$ ethacrylates, hydroxy alkyl acrylates, N-vinyl 2-pyrollidone, stearylmethacrylate, hydroxyethylmethacrylate, lauryl methacrylate, etc. It will be readily seen that other vinyl monomers may be employed in the practice of this invention and the listing above is not meant to limit those vinyl monomers covered in the present specification.

The types and amonts of particular monomers used will depend upon the particular application to which the resultant polymer is employed. As an example, polymers may be produced which can be rendered water-soluble by addition thereto of a water-soluble acid or base. Other polymers may be produced which are completely water insoluble.

In a preferred embodiment of this invention the non-aqueous dispersion polymers are formed from a mixture of monomers of which at least one is from each group consisting of: (a) acrylamide methacrylamide; (b) acrylic methacrylic or ethacrylic acid;, (c) methyl acrylates, ethyl acrylates and $C_5$-$C_{18}$ alkyl methacrylates. Most preferably, the polymers of the instant invention contain (a) acrylamide, (b) acrylic acid, and either (c) ethyl acrylate, or (d) stearyl methacrylate monomer. It will be readily seen, however, to those skilled in the art that other monomers having similar functionality can be employed without departing from the scope of this invention.

It is sometimes useful in the practice of this invention, again depending upon the particular application to which the resultant polymer will be employed to use certain crosslinking agents. When used these materials which are generally multi-functional monomers are incorporated into the polymer chain. Among the material which can be employed for this purpose include the glycerol adduct of allyl glycidyl ether, the allyl amine adduct of a maleic anhydride methyl vinyl ester copolymer, or the like. Other branching agents or crosslinking agents are generally well-known to those skilled in the art. When employed in the practice of this invention they are generally used at levels of less than 10% by weight of the total monomer charge and preferably less than 5% by weight of the total monomer charge. Most preferably, when branching agents are utilized they are employed at less than 1% by weight of the total monomer charge.

The Solvent System

The non-aqueous dispersion polymerization technique of this invention is carried out in a solvent having tertiary carbon atoms and active hydrogen sites which during the polymerization reaction branches with the polymer. The solvent will also generally be of a polar nature, contain oxygen, and have at least two labile hydrogen atoms. A representative compound of this type and one that is preferred for us in this invention is 2,2 dimethyl-3,hydroxy, 4,methyl amyl isobutrate. It is believed that solvents of this type are partially soluble in both oil and water and are attracted to the polymer. The stabilization mechanism is believed to involve stearic stabilization and the solvent is thus incorporated into the polymer chain. The solvent may contain from 4-25 carbon atoms and preferably, from 6-20 carbon atoms. Most preferably, the solvents contain 8-15 carbon atoms. These polar oxygen containing solvents having at least two labile hydrogen atoms and at least one tertiary carbon atom are believed unique in their ability to function as both a solvent and "Pseudo-Initiator" in this type of non-aqueous dispersion polymerization.

Due to the fact Texanol is exemplary of this type of material. The resultant discussion will be centered on this particular solvent.

The Stabilizer

While one of the advantages of the instant invention is that stabilizers do not have to be employed, the use of a stabilizer in the process of the instant invention, is not precluded. A typical stabilizer that may be employed in the subject invention is a terpolymer of isobutylmethylacrylate, lauryl methacrylate and acrylic acid in a weight ratio of 10:4:6. Stabilizers of this type are generally polymerized in the particular organic solvent employed prior to the addition of the monomers used for the desired non-aqueous dispersion polymer. This procedure will be exemplified in the working examples.

The Process

The process of the subject invention is a free radical polymerization conducted in the presence of the organic solvents specified above. Generally, any free radical catalyst that is soluble in the reaction media can be used. Exemplary materials are azo bis isobutyronitrile, as well as other azo materials. The polymerization reaction is generally conducted in the absence of oxygen and may be conducted at temperatures ranging from as low as 10° C. up to and past the boiling point of the particular monomers and/or reaction media employed so long as suitable pressure equipment is available. The uniqueness of the polymerization process of the subject invention is, of course, the organic solvent employed, which participates in the actual polymerization reaction.

In order to illustrate the novel features of the subject invention, the following examples are presented.

EXAMPLE 1

Preparation of Stabilizer

This example shows the preparation of a non-aqueous dispersion polymer according to the subject invention using a stabilizer material and incorporating a branching agent in accordance with this invention.

500 grams of Texanol in a reaction flask were heated to 60° C.; nitrogen was introduced and the following was added while stirring:
 isobutyl methacrylate: 10 grams)hydrophobic,
 lauryl methacrylate: 4 grams)stabilizer,
 acrylic acid: 6 grams.

To the mixture was added ½ gram of azo bis isobutyronitrile. After one-half hour of the addition of the initiator the reaction assumed a milky color.

Preparation of Non-Aqueous Dispersion Polymer

To the reaction flask was then added:
 acrylamide: 20 grams,
 acrylic acid: 50 grams,
 hydroxy ethyl methacrylate: 20 grams,
 ethyl acrylate: 5 grams,
 stearyl methacrylate: 5 grams,
 glycerol adduct of allyl glycidyl ether: 0.4 grams.

The addition of the monomer mixture was made in four slug additions over a period of one hour. The temperature of 60° C. was maintained for another four hours; at the end of that period 0.1 gram of azo bis isobutyronitrile was added and the mixture then heated at 80° C. for one hour. The reaction mixture was allowed to cool, afterwards removing the product having an intrinsic viscosity of 1.29, a reduced specific viscosity of 1.38 and a molecular weight of $3.41 \times 10^5$.

It should be pointed out that the molecular weight of a crosslinked material such as that produced is difficult to quantatively detail or calculate, based upon intrinsic viscosity alone.

The product so removed has the consistency of yogurt and may be dissolved in a solution of NaOH, NH$_4$OH or any low molecular weight amine, in accordance with standard practice, resulting in a water-soluble polymer. These characteristics are true of all the following examples.

The Brookfield viscosity of a 1.0% neutralized polymer solution of Example 1 was 3,500 c.p.s. Unreacted monomer levels were below 0.4%.

EXAMPLE 2

This example shows the preparation of a different non-aqueous dispersion polymer using the same stabilizer and procedure as Example 1. The monomer mixture used was:
 acrylamide: 10 grams,
 acrylic acid: 50 grams,
 hydroxy ethyl methacrylate: 20 grams,
 ethyl acrylate: 5 grams,
 stearyl methacrylate: 5 grams,
 glycerol adduct of allyl glycidyl ether: 0.4 grams.
 N-Vinyl 2 Pyrollidone: 10.0 grams.

The Brookfield viscosity of a 1.0% neutralized polymer solution prepared from Example 2 was 2,800 c.p.s. Unreacted monomer levels were below 0.4%.

The materials prepared in Examples 1 and 2 above may be useful rheology modifiers for water-based or latex paints.

EXAMPLE 3

The procedure of Example 1 was repeated with the exception of adding the azo bis iso butyronitrile, 30 minutes after heating the reaction mixture to 60° C. The following monomer mixture was added:
 acrylamide: 10 grams,
 acrylic acid: 50 grams,
 hydroxy ethyl methacrylate: 20 grams,
 ethyl acrylate: 5 grams,
 stearyl methacrylate: 5 grams,
 2-Hydroxy ethyl acrylate: 10 grams,
 glycerol adduct of allyl glycidyl ether: 0.4 grams.

The Brookfield viscosity of a 1.0% neutralized polymer solution prepared from Example 3 was 960 c.p.s. Unreacted monomer levels were below 0.4%.

EXAMPLE 4

This example shows the preparation of a non-aqueous dispersion polymer not containing a branching agent. The procedure employed was similar to Example 1.

A reaction vessel containing 500 grams of Texanol was heated at 60° C. under a nitrogen purge and the following mixture of monomers and initiator was added:
 isobutyl methacrylate: 10 grams,
 lauryl methacrylate: 4 grams,
 acrylic acid: 6 grams,
 azo bis isobutyronitrile: 0.5 grams.

After one-half hour at 60° C., while stirring, the following mixture of monomer was added to the thus formed stabilizer:
 acrylamide: 40 grams,
 acrylic acid: 50 grams, ethyl acrylate: 5 grams,
stearyl methacrylate: 5 grams.

The monomer mixture was added in four equal additions over a period of one hour. The mixture was then heated at 60° C. for four hours. Afterwards, 0.1 gram of azo bis isobutyronitrile was added and the mixture was heated at 80° C. for one hour, resulting in the desired product.

The Brookfield viscosity of a 1.0% neutralized polymer solution prepared from Example 4 was 7200 c.p.s. Unreacted monomer levels were below 0.4%.

EXAMPLE 5

Using the procedure of Example 4 a stabilized non-aqueous dispersion polymer having the following monomer content was prepared:
acrylamide: 15 grams,
acrylic acid: 75 grams,
hydroxy ethyl methacrylate: 30 grams,
N-vinyl 2 pyrollidone: 15 grams,
ethyl acrylate: 5 grams,
stearyl methacrylate: 7.5 grams.

The Brookfield viscosity of a 1.0% neutralized polymer solution prepared from Example 5 was 2800 c.p.s. Unreacted monomer levels were below 0.4%.

EXAMPLE 6

This examples shows the preparation of a non-aqueous dispersion polymer of the instant invention without the use of a stabilizing agent. It is important to note that with the unique reaction system no stabilizer is needed to suspend the material in the reaction media.

To a reaction vessel containing 600 grams of Texanol at 60° under nitrogen purge was added one gram of azo bis isobutyronitrile. After five minutes following the addition of the initiator, the following monomer mixture was added in five equal additions over a period of twenty-five minutes:
acrylamide: 20 grams,
acrylic acid: 100 grams,
hydroxy ethyl methacrylate: 40 grams,
N-vinyl 2 pyrollidone: 20 grams,
ethyl acrylate: 10 grams,
stearyl methacrylate: 10 grams.

After maintaining the reaction mixture at 60° C. for four hours 0.15 gram of azo bis isobutyronitrile was added and the mixture was then heated at 80° C. for an hour and a half to obtain product.

The Brookfield viscosity of a 1.0% neutralized polymer solution prepared from Example 6 was 200 c.p.s. Unreacted monomer levels were below 0.4%.

EXAMPLE 7

The procedure of Example 6 was followed using the following monomer mixture:
acrylamide: 20 grams,
acrylic acid: 100 grams,
hydroxy ethyl methacrylate: 40 grams,
N-vinyl 2 pyrollidone: 20 grams,
ethyl acrylate: 10 grams,
stearyl methacrylate: 10 grams,
glycerol adduct of allyl glycidyl ether: 0.4 grams.

The Brookfield viscosity of a 1.0% neutralized polymer solution prepared from Example 7 was 800 c.p.s. Unreacted monomer levels were below 0.4%.

EXAMPLE 8

To a reaction vessel containing 400 grams of Texanol heated to 60° C. with a nitrogen purge, the following monomer was added in equal 25 gram increments twenty minutes apart (the first addition contained 0.2 gram azo bis isobutyronitrile):
acrylamide: 60 grams,
acrylic acid: 75 grams,
ethyl acrylate: 7.5 grams,
stearyl methacrylate: 7.5 grams.

The mixture was heated at 65° C. for four hours and then at 80° C. for one hour.

The Brookfield viscosity of a 1.0% neutralized polymer solution prepared from Example 8 was 400 c.p.s. Unreacted monomer levels were below 0.4%.

EXAMPLE 9

To a reaction vessel containing 400 grams of Texanol at 60° C. under a nitrogen purge, an initiator mixture was added as follows:
azo bis isobutyronitrile catalyst: 0.2 grams,
isobutyl methacrylate: 10 grams,
lauryl methacrylate: 4 grams,
acrylic acid: 6 grams.

After twenty minutes following addition of the initiator mixture the following monomer mixture was added in 25 gram increments at twenty-minute intervals:
acrylamide: 20 grams,
acrylic acid: 50 grams,
hydroxy ethyl methacrylate: 20 grams,
stearyl methacrylate: 5 grams,
ethyl acrylate: 5 grams.

The mixture was maintained at 65° for four hours after which 0.2 gram of catalyst was added at 80° C., maintained for one hour to complete the product.

The Brookfield viscosity of a 1.0% neutralized polymer solution obtained in Example 9 was 5600 c.p.s. Unreacted monomer levels were below 0.4%.

The polymers produced according to the subject invention find applicability in many different applications. As an example, the sodium salt form of any one of Examples 1, 2, or 3 are useful thickeners for water-based paints. The improvement resides not only in the present thickener is not biodegradable, but also that it exhibits high branching density and excellent water resistance. Additionally, materials of the type described allow for better film building, flow, and leveling, as well as improved tint strength compared to hydroxy ethyl cellulose thickeners.

The preformance of polymers prepared according to the previous examples was evaluated on several latex paintformulations. When the polymers of the subject invention (as indicated) were substituted hydroxy ethyl cellulose as the thicker, improved or equal tin strengths, applicaton properties, and high sheer viscosity were obtained. Results are shown in Table I.

TABLE I

| | | Paint Performance Results | | | | | |
|---|---|---|---|---|---|---|---|
| Products | Dosage Lbs/100 Gal. | Tint Strength | Application Properties | Thixotrypy T168 gms. | Stormer Sheared | Viscosity Unsheared | ICI |
| A. Latex Paint Formulation 1 | | | | | | | |
| * | 5.0 | Std. | Std. | 100 | 87 | 91 | 0.55 |

TABLE I-continued

| Products | Dosage Lbs/100 Gal. | Paint Performance Results | | | | | |
|---|---|---|---|---|---|---|---|
| | | Tint Strength | Application Properties | Thixotrypy T168 gms. | Stormer Sheared | Viscosity Unsheared | ICI |
| Example #1 | 4.5 | +2 | = | 100 | 85 | 89 | 0.8 |
| Example #2 | 5.0 | +2 | + | 100 | 92 | 100 | 0.8 |
| B. Latex Paint Formulation II | | | | | | | |
| ** | 2.3 | Std | Std | 100 | 74 | 71 | 1.08 |
| Example #1 | 2.3 | = | = | 100 | 71 | 69 | — |
| Example #2 | 2.3 | = | + | 100 | 70 | 70 | 1.4 |

*Hydroxy ethyl cellulose available from Union Carbide.
**Hydroxy ethyl cellulose available from Hercules.

Another useful feature of the subject polymers is that while when most water-soluble polymers having anionic functionality undergo viscosity degradation in the presence of salt, materials produced according to the present invention actually gain viscosity in the presence of dilute salt solutions. This property makes these types of materials useful as for example in the secondary and tertiary oil recovery areas.

The polymers of this invention may also be used accordingly as thickeners for salt solutions since they are insensitive to the salt content.

Results showing the salt insensitive properties of the polymers of the instant invention are shown in Table II. Also shown are comparative polymers prepared by an inverse-latex polymerization method such as that pointed out in Vanderhoff U.S. Pat. No. 3,284,393.

TABLE II

Viscosity of Non-aqueous dispersion polymers Prepared according to the subject invention In salt solutions

| Example # | % Brancher | Wt. % AcAm | Wt. % AcAcid | Wt. % HEMA | Wt. % EtAc | Wt. % StMAc | Wt. & Any Other Monomer | Stabilizer | Viscosity of 1.0% ACTIVE POLYMER[1] | | |
|---|---|---|---|---|---|---|---|---|---|---|---|
| | | | | | | | | | 0 KCL | 1% KCL | 2% KCL |
| 4 | — | 40 | 50 | — | 5 | 5 | — | Yes | 7,200 | 7,900 | 5,600 |
| 5 | — | 10 | 50 | 20 | 5 | 5 | NVP-10 | Yes | 2,800 | 4,000 | 3,300 |
| 8 | — | 40 | 50 | — | 5 | 5 | — | No | 400 | 3,400 | 3,300 |
| 6 | — | 10 | 50 | 20 | 5 | 5 | NVP-10 | No | 200 | 1,680 | 880 |
| 9 | — | 20 | 50 | 20 | 5 | 5 | — | Yes | 5,600 | 6,500 | 4,100 |
| 7 | 0.2 | 10 | 50 | 20 | 5 | 5 | NVP-10 | No | 800 | 1,760 | 760 |
| 3 | 0.4 | 10 | 50 | 20 | 5 | 5 | HEA-10 | No | 960 | 2,700 | 2,000 |
| Inverse Latex | 0.2 | 20 | 50 | 20 | 5 | 5 | — | — | 16,000 | 40.0 | 30.0 |
| Inverse Latex | 0.4 | 50 | 30 | 20 | — | — | — | — | 22,000 | 20.0 | 18.0 |

[1]Brookfield Viscosity at 100 rpm by RVT viscometer
AcAm Acrylamide
AcAcid Acryllic Acid
HEMA Hydroxyethylmethacrylate
EtAc Ethylacrylate
HEA Hydroxy ethyl acrylate
NVP N—vinyl pyrrolldone As seen in the accompanying examples, the polymeric material of this invention possess unique properties, especially when prepared without the addition of an added stabilizer. The uniqueness of the solvent types employed in the non-aqueous dispersion polymerization process serve to product materials having many application.

Having thus described our invention, we claim:

1. In a non-aqueous dispersion polymerization process wherein a water-soluble vinyl addition monomer along with a water insoluble vinyl addition monomer is polymerized in the presence of an organic solvent under free radical forming conditions, the improvement comprising using as the organic solvent a material having at least two labile hydrogen atoms, a free hydroxy group and at least one tertiary carbon atom, said solvent further characterized as having from 8–15 carbon atoms.

2. The improvement of claim 1 wherein the organic liquid is 2,2 dimethyl-3-hydroxy,4-methyl amyl isobutarate.

3. An improved non-aqueous dispersion polymerization process in which at least one monomer from each of the following groups consisting of:
   (a) acrylamide, methacrylamide, and derivatives of acrylamide;
   (b) acrylic acid, methacrylic acid, ethacrylic acid
   (c) methyl acrylates, ethyl acrylates and, $C_5$–$C_{18}$ alkyl methacrylates
are polymerized under free radical forming conditions in an organic solvent, the improvement comprising using as the organic solvent a solvent containing two labile hydrogen atoms, a free hydroxyl group and at least one tertiary carbon atom, said solvent further characterized as having from 8–15 carbon atoms.

4. The improvement of claim 3 wherein the organic solvent is 2,2 dimethyl-3-hydroxy,4-methyl amyl isobutarate.

5. Non-aqueous vinyl dispersion polymers prepared according to claim 1.

6. Non-aqueous vinyl dispersion polymers prepared according to claim 2.

7. Non-aqueous vinyl dispersion polymers prepared according to claim 3.

8. A water-based latex paint containing a non-aqueous vinyl dispersion polymer prepared according to claim 1.

9. An oil-in-water emulsion having added thereto a non-aqueous vinyl dispersion polymer prepared according to claim 1.

10. A tertiary recovery agent for petroleum comprising a non-aqueous dispersion polymer prepared according to claim 1.

11. An aqueous dispersion having added thereto a non-aqueous vinyl addition polymer prepared according to claim 1.

12. A salt-insensitive thickener prepared according to the method of claim 1.

13. A salt-insensitive thickener prepared according to the method of claim 3.

* * * * *